Feb. 17, 1925.
L. W. MOULTON
MULTIPLE DRILL PRESS
Filed Dec. 11, 1920    2 Sheets-Sheet 1
1,526,676
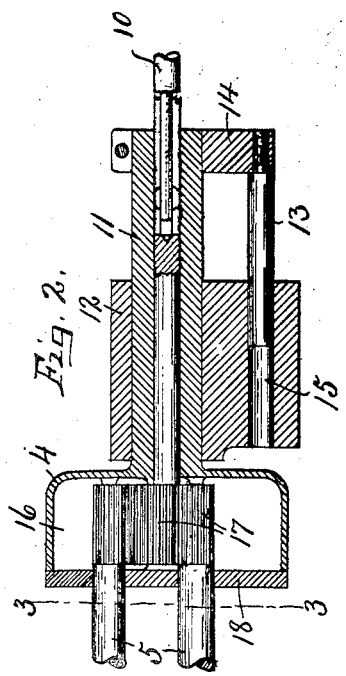
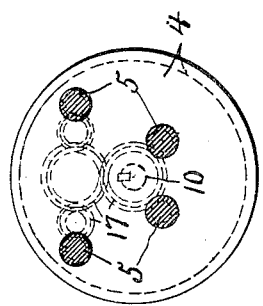
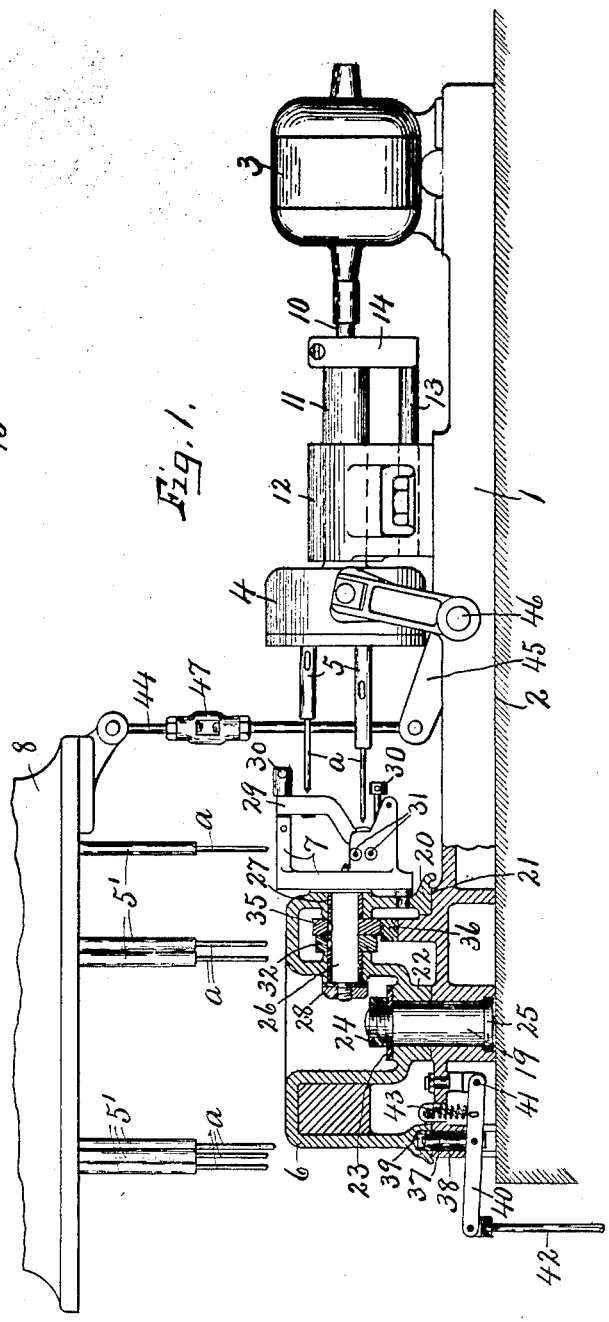
INVENTOR
L. W. Moulton
BY
Howard P. Denison
ATTORNEY

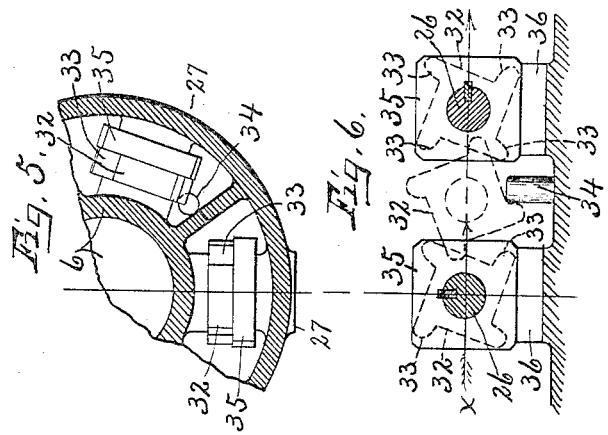
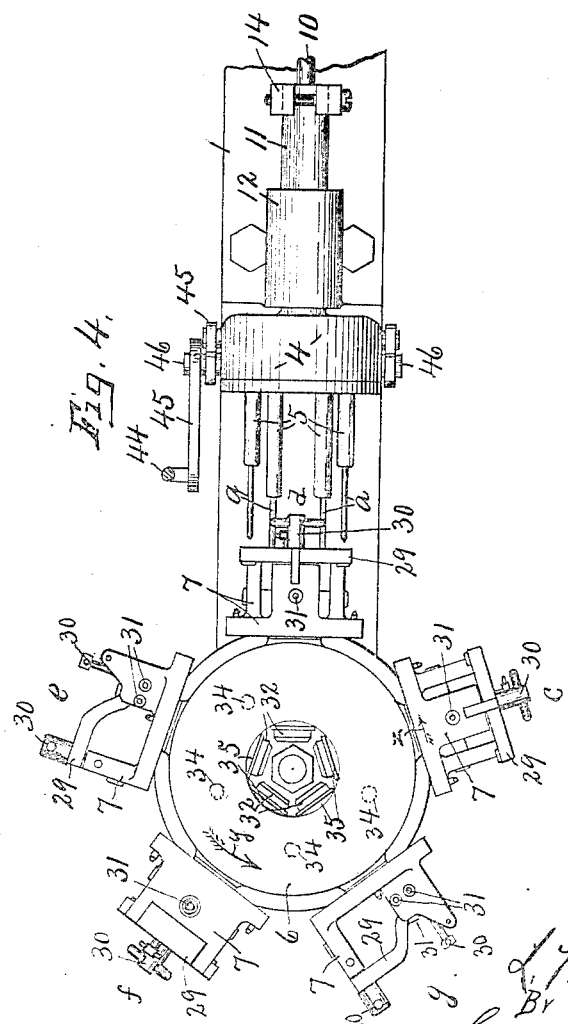

Patented Feb. 17, 1925.

1,526,676

UNITED STATES PATENT OFFICE.

LLOYD W. MOULTON, OF SYRACUSE, NEW YORK.

MULTIPLE-DRILL PRESS.

Application filed December 11, 1920. Serial No. 429,973.

*To all whom it may concern:*

Be it known that I, LLOYD W. MOULTON, of Syracuse, in the county of Onondaga, in the State of New York, have invented new and useful Improvements in Multiple-Drill Presses, of which the following, taken in connection with the accompanying drawings, is a full, clear, and exact description.

This invention relates to certain improvements in multiple drill presses in which a plurality of drills are arranged to operate upon the work at different angles, and involves the use of one or more jigs carried by a suitable support for directing the drills to the work.

One of the objects is to provide a means whereby the drills or other tools may be simultaneously moved to and from the work at different angles thereto.

Another object is to mount the jigs upon a rotatable support in such manner that they may be successively brought into registration with the tools for operation upon the work.

Another object is to provide means for rotating the jigs relatively to and during the rotation of the support, as they are successively brought into registration with the tools.

Other objects and uses relating to specific parts of the device will be brought out in in the following description.

In the drawings:—

Figure —1— is a side elevation, partly in section, of a multiple drill press embodying the various features of my invention.

Figure —2— is an enlarged, longitudinal, sectional view of the support for the horizontally reciprocating drill spindles and supporting guides therefor.

Figure —3— is a sectional view taken on line 3—3, Figure —2—, in which the train of gears for transmitting motion from the motor shaft to the drill spindles is shown by dotted lines.

Figure —4— is a top plan of the mechanism shown in Figure 1 omitting the carrier for the vertically movable drill spindles and motor.

Figure —5— is an enlarged, horizontal sectional view of a portion of the rotary support for the jigs, showing more particularly the cams and angular disks for turning the jigs and holding them in fixed relation to their support as they are successively brought into position to be operated upon by the drills or other tools.

Figure —6— is an end view, partly in section, of two of the cams and their holding disks together with the stationary stud and rests for turning the jigs and holding them in their adjusted positions while the work is being operated upon by the drills, the parts being shown in a flat, vertical plane or development of the circle in which they are normally arranged.

In order that my invention may be clearly understood, I have shown a bed plate —1— mounted upon any suitable support —2— for receiving and supporting an electric motor —3—, a tool carrier —4— for a series of drill spindles —5— and a rotary jig support turret —6— carrying a series of, in this instance five, work holding jigs —7— over which is mounted a vertically movable tool carrier —8— for a series of drill spindles —5'—. The motor —3— is secured by any suitable fastening means to the bed plate —1— and is provided with a horizontally extending sectional shaft —10—, which, as shown more clearly in Figure —2—, is journaled in a horizontally reciprocating sleeve —11— and has its sections splined one upon the other telescopically for relative axial movement.

This sleeve with one of the motor shaft sections therein is slidable endwise in a suitable bearing —12— on the bed plate —1— and is held against turning by an offset guide pin —13— which is secured to the outer end of the sleeve by means of a clamp —14— and is movable endwise in a guide opening —15— in the bearing —12—.

The carrier —4— for the drill spindles —5— is secured coaxially of and upon the inner end of the sleeve —11—and is provided with an inner chamber —16— for receiving a train of gears —17— by which rotary motion is transmitted from the motor shaft —10— to the drill spindles —5—, the inner end head or gear case of the carrier —4— being provided with a removable plate —18— to permit access to the gears —17—, when desired, and also forms a bearing for the adjacent ends of said spindles and cooperates with the opposite end walls of the gear case to hold the gears against endwise movement.

The spindles —5— extend some distance beyond the inner face of the carrier —4— and are provided with means for receiving and supporting a corresponding number of drills or other tools —a—, which together with the spindles —5— and carrier —4— are movable axially or horizontally to and from the work in the jigs —7— presently described.

The jig supporting turret —6— is rotatably mounted upon a vertical shaft or stud —19— on the bed plate —1— to rotate about a vertical axis, and is provided with a concentric annular flange —20— movable around and upon an annular seat —21— on said bed plate some distance from the axis of the shaft or stud —19—, to steady the turret —6— against vibratory movement during its rotation and also serving to resist the strains incidental to the operation of the drill spindles —5— and —5'— upon the work in the jigs —7—. The central portion or hub —22— of the turret —6— is depressed some distance below the upper face thereof and is engaged by a washer —23— which is held in place by a nut —24— engaging the reduced, threaded, upper end of the stud —19— for holding the turret 6 against upward displacement, the lower end of said stud being provided with an annular shoulder —25— for engaging the under side of the bed plate —1— to hold the stud against upward displacement.

The jigs —7— are substantially identical in form and are adapted to receive different pieces of similar work, each of which is to be operated upon or drilled in five sides thereof, four of which are disposed about the axis of rotation of the jig to be operated upon sequentially by the drills —5'—, while the other side faces in the direction of extension of said axis adjacent the drills —5—, to be operated upon by the last named drills.

These jigs —7— are arranged circumferentially around the axis of the rotary turret —6— in uniformly spaced relation and are provided with horizontally extending spindles —26— extending radially through suitable bearings —27— in the turret —6—, to permit the jigs to be rotated relatively to the turret, the main bodies of the jigs being enlarged and engaged with the outer end faces of the bearings —27—, to hold them against axial movement, while the inner ends of the spindles —26— are provided with nuts —28— screwed thereon for engaging the inner ends of the bearings —27—, to hold the jigs against axial movement in the opposite direction.

Each jig is adapted to receive and support a similar piece of work, which is held therein by means of a clamping plate —29— and clamping screws —30—, mounted upon the outer end of the jig to rotate therewith.

The four sides and outer end of the jig are provided with suitable guide openings —31— corresponding in number to the number of drill spindles —5— and —5'— which are alined with said openings as the turret —6— is adjusted rotarily to different positions.

Suitable means is provided for automatically rotating each jig, in this instance one-quarter turn about its axis during each rotary adjustment of the turret —6—, said means consisting of a cam disk —32— which is keyed to its jig spindle —26— and is provided with a series of, in this instance four, cam faces or projections —33— at the four corners thereof, and in equally spaced relation circumferentially about the axis of said spindle for successively engaging a stationary stud or pin —34— on the bed plate —1— as the jigs with the work therein are successively brought into position for receiving the drills —a— of both of the reciprocating carriers —4— and —8— at which time each disk is held against turning movement by a substantially rectangular detent disk —35—, which is also keyed to the shaft or spindle —26— adjacent the disk —32—, so that its four sides may successively ride upon stationary, flat seats or rests —36— on the bed plate —1—, following each successive movement of the turret —6— and rotary adjustment of the jigs.

For example, in Figure —6— I have shown two of the jig spindles —26— and disks —32— and —35— mounted thereon in their normal positions of rest, in which one of the flat sides of each of the disks —35— is engaged with one of the underlying rests or seats —36— to hold the jigs against turning during the drilling operations.

As soon as the drills —a— are withdrawn from the work, the turret —6— rotated by hand or otherwise to cause the jigs to move in the direction indicated by the arrow —x—, Figure —6—, during which movement the cams —33— nearest the pins or studs —34— will be brought into engagement with said studs and thereby cause the rotation of the jigs one-quarter turn and at the same time bringing the next succeeding, flat face of the disks —35— into engagement with the next succeeding rests —36— to present the next succeeding faces of the jigs to the drills and to hold said jigs against turning movement during the next succeeding drilling operation, these operations being repeated at each rotary adjustment of the turret —6—, in this instance one-fifth of a turn, it being understood that the degree of rotary adjustment of the turret —6— depends upon the number of the jigs mounted thereon, which number may be varied at will according to the work to be performed.

Suitable means is provided for locking and releasing the rotary turret —6— in and from its various positions of rest and, for this purpose, is provided a locking bolt —37— movable in a guide opening —38— into and out of sockets —39— in the lower edge of the annular flange —20—, said locking bolt being pivotally connected to an operating lever —40— which is fulcrumed at —41— upon the bed plate —1— and may be connected by a link —42— to a pedal or any other suitable actuating member, not necessary to herein illustrate or describe, the lever —40— being retracted by a spring —43— to yieldingly hold the bolt —37— in its locking position.

The sockets —39— correspond in number to the number of jigs —7— on the rotary turret —6— and are separated uniform distances apart circumferentially around the axis of said turret to successively register with the locking bolt —37— as the jigs with the work therein are successively brought into position to be operated upon by the drills —a—.

As previously intimated, the carrier —8— carrying the drill spindles —5'— may be reciprocated vertically by any suitable mechanism, not necessary to herein illustrate or describe, while the drill spindles —5'— may be rotated by any of the well known forms of driving mechanisms commonly used for driving spindles on a vertically, reciprocating head.

It is desirable to provide means for reciprocating the carrier —4— simultaneously with that of the carrier —8— so that the drills of both heads or supports may enter the work at the same time and, for this purpose, the carrier —8— is connected by a link —44— to one arm of a bell crank lever —45— which in turn is fulcrumed at —46— upon the bed plate —1— and has its other arm or arms pivotally connected to the carrier —4—, whereby, as the carrier —8— is depressed to bring the vertical spindles into engagement with the work, the carrier —4— will be moved inwardly to bring its spindles into engagement with the work at right angles to that of the vertical spindles —a—, the reverse or upward movement of the carrier —8— serving to return the carrier —4—.

The link —44— is provided with a turn buckle —47— by which the movement of the carrier —4— may be adjusted to regulate the degree of axial movement of the corresponding drills —a— relatively to that of the drills of the carrier —8—.

As shown more clearly in Figure —4—, the jigs —7— on the turret —6— are arranged in five different positions which also represent the normal positions of rest, while the work therein is being drilled, these positions being designated by the reference letters —c—, —d—, —e—, —f— and —g—, the turret being rotated in the direction indicated by the arrow —y—, while the direction of rotation of the jigs about their respective axes is indicated by the arrow —z—, as the turret —6— is rotated.

The turret —6— is preferably rotated by hand to successively register the jigs —7— with the horizontally movable spindles —5— carried by the carrier —4—, at which time the jigs are all held against rotary movement about their respective axes by the engagement of the flat sides of the corresponding disks —35— with the rests —36—, while the locking bolt —37— serves to hold the turret in its different positions of rest.

The pieces of work to be operated upon are placed in the jigs at position —c— In a certain definite position with relation thereto, whereupon the locking bolt —37— is withdrawn to release the turret —6—, which is then turned one-fifth of a turn to move the jig with the work therein from the position —c— to the position —d— in registration with the drill spindles —5— and also registering its single, vertical, guide opening —31— with the corresponding, single drill —a—, shown at the right hand of the carrier —8— Figure —1— in which figure four sets of drill spindles —5'— are shown, one at the right, two intermediate and another group of three at the left, two of which constitute a third set and the other a fourth set, said drill spindles —5'— being arranged circumferentially about the axes of the turret —6— corresponding to the guide openings —31— in the jigs at the positions —d—, —e—, —f— and —g—, hereafter termed the drilling or working positions.

After the drilling operation at position —d— is completed and another piece of work is inserted in the next succeeding jig at position —c—, the locking bolt —37— is again released and the turret —6— turned another fifth turn and relocked by the bolt —37—.

Each jig with the work therein is held against turning while being shifted from position —c— to position —f—, while the jig at position —d— with the work therein previously drilled at the end and top will have been shifted from position —d— to position —e—, at which time it will have been rotated one-quarter turn by the engagement of its cam disk —32— with the pin —34—, to present a different side of the jig and work to the intermediate set of vertical drills —5'—, whereupon the carriers —8— and —4— are again operated to cause their drills to enter the work in positions —d— and —e—.

When this second drilling operation is completed and a third piece of work has been inserted in the jig at position —c—, the turret —6— is again rotated a fifth turn with the result that the jig which was previously at position —c— will be brought to position —d—, while those at positions —d— and —e— respectively will be brought to positions —e— and —f— with the result that the jigs moved from the position —d— to —e— and from —e— to —f— will each be turned a quarter turn, due to the engagement of their respective cam disks —32— with the pin —34—, thus bringing the guide openings —31— of the jigs at positions —d—, —e— and —f— into registration with the corresponding vertical drill spindles —5'—, it being understood that there is, in this instance, one vertical drill spindle —5'— for position —d—, two for position —e—, one for position —f— and two for position —g—, all mounted upon the vertically, movable carrier —8—.

Again when the drilling operation is completed at positions —d—, —e— and —f—, the turret 6 is again released by the unlocking of the bolt —37— and, after another piece of work has been inserted in the jig at position —c, is again rotated another fifth turn to bring the jig with the work therein from the position —c— to position —d— and simultaneously advancing the remaining jigs to positions —e—, —f—, —g— and —c— respectively and, at the same time, causing said remaining jigs to be turned a one-quarter revolution by the engagement of their respective cam disks —32— with the pin —34—, thus completing the cycle of operation and permitting the finished work to be withdrawn at position —g—, in which latter position, the fourth or last side of the jig and work therein are presented to the last remaining set of vertical spindles —5'—, it being understood that there are no spindles registering with position —c— but only with positions —d—, —e—, —f— and —g— and that the jigs are successively returned to their starting positions in passing from position —g— to position —c—, ready for repetition of the operations previously described.

It is also to be understood that the jig in passing from position —c— to position —d— is held against turning by engagement of its disk —35— with its track —36—, which is elongated through the corresponding arc and that the pin —34— is omitted in that arc, but are interposed between all of the other rests —36—, as shown by dotted lines in Figure —4—, to effect the turning movement of the jig with the work therein, as they are shifted from position —d— to positions —e—, —f—, —g— and return to —c—.

By means of the construction and operation described, it is evident that an operator standing in the same position may place the work to be operated upon in the jigs as they are successively brought to position —c—, and may remove the finished work from the jigs as they are successively brought to position —g—, and that at each operation the work is drilled at one end and at four different sides, and that the work is completed, ready for removal, at the fourth shift or at position —g—, the ends of the work and facing sides thereof being successively presented to their respective drills during each step by step movement of the turret —6—.

What I claim is:

1. In a multiple drill press, a set of rotary drill spindles arranged in sequence in spaced relation, a jig movable step by step in one plane into registration with the several drill spindles and having an independent rotary movement in a different plane, a support for the jig, means for clamping the work to the jig and means for bringing the drills and jig into working relation.

2. In a multiple drill press, a set of rotary drill spindles arranged in sequence in spaced relation, a jig movable step by step into registration with the several drill spindles, a support for the jig and means for bringing the drills and work into working engagement, said jig being rotatable upon its support in another plane to present different sides of the work to the drills.

3. In a multiple drill press, a set of rotary drill spindles arranged in sequence in spaced relation, a jig movable step by step in one plane into registration with the several drill spindles, a support for the jig, means for clamping the work to the jig and means for bringing the drills and jig into working relation, said jig being rotatable in another plane upon its support to present different sides of the work to the drills, and means for automatically rotating the jig about its axis while it is passing from one to another of the drills.

4. In a multiple drill press, a rotary jig support, said support and jig being rotatable in different planes, a jig rotatably mounted in the support, a carrier movable axially of and toward and from the support, rotary tool-spindles mounted on the carrier about the axis of said support to register with the jigs as the support is rotated, and means for rotating the jigs upon the support as said support is moved rotarily.

5. In a multiple drill press, the combination of a reciprocating carrier having drill-spindles thereon about a common axis, a rotary jig-support coaxial with said axis, a jig mounted on said support and movable therewith into registration with the drills successively, said jig being rotatable in different planes from that of the support to present different sides thereof to the drills and means on the jig for clamping the work thereto.

6. In a machine of the character described, a jig support adjustable rotarily about an axis, a carrier movable axially of and toward and from the jig support, a series of rotary tool-carrying spindles mounted on the carrier about said axis, and a jig journaled on the support to rotate about an axis at right angles to the first named axis and provided with a plurality of drill guides in spaced relation about its axis.

7. In a machine of the character described, a jig support adjustable rotarily about an axis, a carrier movable axially of and toward and from the jig support, a series of rotary tool-carrying spindles mounted on the carrier about said axis, a jig mounted on the support and movable therewith into and out of registration with the drills as the jig support is rotated, said jig having independent rotary adjustment about a different axis at an angle to that of its support.

8. In a machine of the character described, a jig support adjustable rotarily about an axis, a carrier movable axially of and toward and from the jig support, a series of rotary tool-carrying spindles mounted on the carrier about said axis, a jig mounted on the support and movable into and out of registration with the drills as the support is rotated, a work-holder on said jig, and a second tool carrier movable toward and from the axis of the jig support.

9. In a machine of the character described, a jig support adjustable rotarily about an axis, a carrier movable axially of and toward and from the jig support, a series of rotary tool-carrying spindles mounted on the carrier about said axis, a jig mounted on the support and movable into and out of registration with the drills as the jig support is rotated, said jig being adjustable rotarily about an axis at an angle to the first named axis, an additional carrier movable in a plane at an angle to the first named axis, and rotary tool-carrying spindles mounted on the second named carrier for movement into and out of engagement with the work when registered therewith.

10. In a machine of the character described, a turret rotatable in one plane, a work-holder rotatable on the turret in another plane parallel with the axis of the turret, a tool-carrier movable axially of the turret, a separate tool-carrier movable axially of the work-holder, and means for transmitting motion from one carrier to the other.

11. In a machine of the character described, a turret rotatable in one plane, a work-holder rotatable on the turret in another plane, a tool-carrier movable axially of the turret, a separate tool-carrier movable axially of the work-holder, means for reciprocating one of the carriers, and means for transmitting reciprocatory motion, from the last named carrier to the other carrier.

In witness whereof I have hereunto set my hand this 29th day of November, 1920.

LLOYD W. MOULTON.

Witnesses:
H. E. CHASE,
M. L. QUINELL.